(12) United States Patent
Kardos et al.

(10) Patent No.: US 8,091,624 B2
(45) Date of Patent: Jan. 10, 2012

(54) COOLING SYSTEM IN A MOTOR VEHICLE

(75) Inventors: Zoltan Kardos, Södertälje (SE); Tomas Alsterdal, Södertälje (SE); Johan Åkeson, Stallarholmen (SE)

(73) Assignee: Scania CV AB (Publ) (SE)

( * ) Notice: Subject to any disclaimer, the term of this patent is extended or adjusted under 35 U.S.C. 154(b) by 967 days.

(21) Appl. No.: 11/575,028

(22) PCT Filed: Sep. 19, 2005

(86) PCT No.: PCT/SE2005/001354
§ 371 (c)(1),
(2), (4) Date: Mar. 29, 2007

(87) PCT Pub. No.: WO2006/033615
PCT Pub. Date: Mar. 30, 2006

(65) Prior Publication Data
US 2008/0041558 A1  Feb. 21, 2008

(30) Foreign Application Priority Data
Sep. 24, 2004 (SE) .................................... 0402310

(51) Int. Cl.
*B60K 11/04* (2006.01)
(52) U.S. Cl. ............ 165/300; 165/41; 165/51; 165/122; 165/140; 180/68.1; 180/68.4; 280/163; 280/164.1; 123/41.08; 123/41.51
(58) Field of Classification Search .................... 165/41, 165/44, 51, 140, 122, 300; 180/68.1, 68.4; 290/1 A, 1 B, 1 R; 280/163, 164.1, 166, 280/169; 237/12.3 A, 12.3 B, 12.3 R; 236/36, 236/34.5, 35; 123/41.08, 41.51
See application file for complete search history.

(56) References Cited

U.S. PATENT DOCUMENTS

| | | | | |
|---|---|---|---|---|
| 1,853,333 A * | 4/1932 | Bates | ............... | 165/122 |
| 1,992,789 A * | 2/1935 | Veale | ............... | 236/34.5 |
| 3,291,504 A * | 12/1966 | Irizarry | ............... | 280/166 |
| 4,836,568 A * | 6/1989 | Preslik et al. | ............... | 280/164.1 |
| 7,034,410 B2 * | 4/2006 | Kennedy | ............... | 290/1 A |

FOREIGN PATENT DOCUMENTS

| | | |
|---|---|---|
| DE | 10159783 | 6/2003 |
| JP | 09-032550 | 2/1997 |
| JP | 10264852 | 10/1998 |
| KR | 2005052671 A * | 6/2005 |

OTHER PUBLICATIONS

International Search Report PCT/SE2005/001354 dated Dec. 5, 2005 (Swedish Patent Office).

* cited by examiner

*Primary Examiner* — John Ford
(74) *Attorney, Agent, or Firm* — Ostrolenk Faber LLP

(57) ABSTRACT

A radiator element in a motor vehicle is disclosed, the motor vehicle including a body, a driver's space with at least one door for access to the driver's space, and a step element with at least one step and situated below the door. An engine cooling system includes a radiator element in which a circulating coolant is cooled by an airflow flowing through the radiator element. The radiator element is positioned close to the step element. An air inlet aperture is positioned between or behind the steps. The radiator element is a second radiator element of the vehicle, operable when the first radiator element cools insufficiently.

15 Claims, 2 Drawing Sheets

COOLING SYSTEM IN A MOTOR VEHICLE

CROSS REFERENCE TO RELATED APPLICATION

Figure 1:
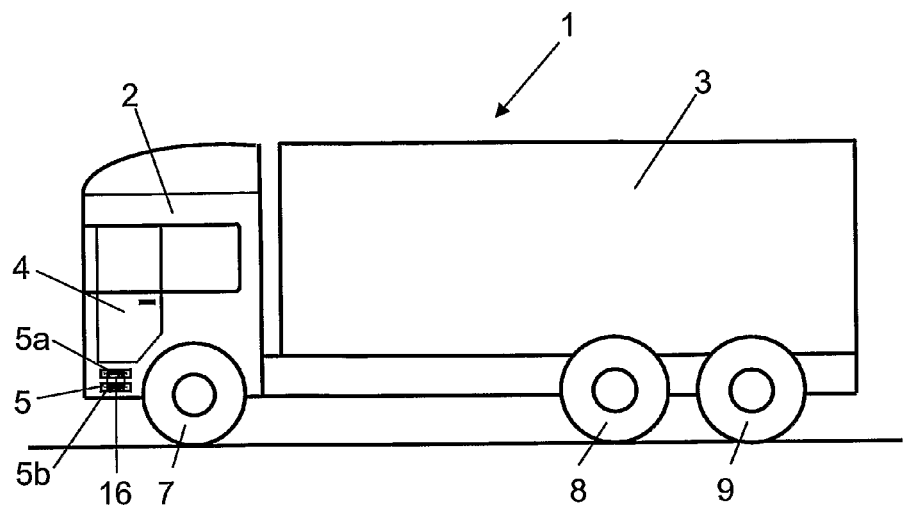

The present application is a 35 U.S.C. §§371 national phase conversion of PCT/SE2005/001354, filed 19 Sep. 2005, which claims priority of Swedish Application No. 0402310-7, filed 24 Sep. 2004. The PCT International Application was published in the English language.

BACKGROUND TO THE INVENTION, AND STATE OF THE ART

The present invention relates to a cooling system in a motor vehicle.

Conventional cooling systems for cooling a combustion engine in a motor vehicle usually comprise a radiator situated in a front portion of the vehicle. Such a radiator location results in a natural cooling air flow through the radiator, but a radiator fan is usually applied to the radiator to ensure that a required air flow is maintained through the radiator during various operating conditions. However, the space in the front portion is limited. Like other spaces in the vehicle, it is also subject to competition from other components of the vehicle. This means that the radiator cannot be larger than a certain size. The capacity of conventional cooling systems is limited by the amount of space available for the radiator in the front portion of the vehicle.

However, the cooling requirements of heavy vehicles are constantly increasing, partly because ever more powerful engines are being used. Another reason is the ever more stringent requirements concerning discharges of exhaust gases, particularly from diesel engines. To provide diesel engines which meet the ever more stringent requirements, it is possible for part of their exhaust gases to be recirculated (EGR, exhaust gas recirculation). Such recirculation reduces discharges of nitrogen oxides, but this method requires cooling of the recirculating exhaust gases. There is also ever increasing use of supercharged combustion engines with ever higher pressures. Vehicle fuel consumption can thereby be reduced, but cooling of the compressed air is required before it is led to the diesel engine. To this end, a so-called charge air cooler is usually employed close to the vehicle's ordinary radiator at the front of the vehicle.

Conventional cooling systems provided only with a radiator at the front of the vehicle are likely to have difficulty in meeting the total cooling requirements of future vehicles, particularly in situations where the vehicle is operated in a hot environment and/or the combustion engine is subject to long periods of high load.

A known practice is to use a cooling system equipped with more than one radiator. A difficulty in such cases is finding a suitable space in the vehicle for fitting such an extra radiator. Such a space needs to be large enough to be able to accommodate a radiator while at the same time being situated in the vehicle in such a way as to make it easy for an air flow to be led through the radiator.

SUMMARY OF THE INVENTION

The object of the present invention is to provide a cooling system in a motor vehicle which has a radiator element for which there is in the vehicle an advantageous fitting space separate from the conventional fitting space at the front of the vehicle.

This object is achieved with a cooling system in which a radiator element is positioned behind or close to the steps of the driver's cabin of the vehicle. Many heavy trucks usually have doors to the driver's space which are situated at a considerable height above ground level on opposite sides of the vehicle. Heavy trucks therefore usually comprise step elements below the respective doors to make it easier for a driver and any passenger to climb up to and down from the driver's space. Situating the radiator element close to such a step element is advantageous from several points of view. There is usually at this location an already existing space large enough to allow the fitting of a radiator. The location is also situated in a region where it is relatively easy to supply ambient air to the radiator element via short air passages.

According to a preferred embodiment of the invention, said radiator is situated forward of a front wheel of the vehicle situated on the driver's side. There is usually an existing space which is situated forward of the wheel housing of the front wheel and internally relative to the vehicle's step element and is very suitable for accommodating a radiator element. It is also possible for the radiator element to be situated forward of the front wheel and internally relative to the step element on the passenger side. Said step element comprises at least one step and the cooling system comprises in the vehicle's body close to said step an inlet aperture through which at least part of the air flow to the radiator element is intended to pass. Providing a suitably shaped inlet aperture in the body close to the step element makes it possible for ambient air to flow substantially directly to the radiator element via a short air passage. With advantage, the inlet aperture is situated in the body below said step. This makes it possible for the location of the inlet aperture to be relatively concealed so as not to be directly visible to an observer. The step element usually comprises at least two steps, in which case the inlet aperture may be situated between said steps. The inlet aperture can thus be provided with a very concealed location where it is substantially hidden by the steps. The steps comprise with advantage a perforated structure so that air can also be led through the steps to the inlet aperture.

According to another preferred embodiment of the invention, the cooling system comprises a duct element which itself comprises a passage for leading said airflow to the radiator element. The duct element may be made of a plastic or sheetmetal material which defines an air passage to the radiator element. A controlled flow of ambient air to the radiator element can thus be achieved so that the coolant in the radiator element is provided with substantially optimum cooling. The duct element may have a passage with an extent from the inlet aperture in the body to the radiator element, thereby ensuring that all the air flowing in through the inlet aperture is also led through the radiator element. Alternatively, such a duct element may have a passage with an extent from an inlet aperture situated on the underside of the vehicle to the radiator element. The underside of the vehicle is normally not covered by any sheetmetal or the like. It is therefore possible to fit the duct element with a portion protruding downwards which comprises such an inlet aperture on the underside of the vehicle. With advantage, the radiator element comprises a radiator fan. The fact that the radiator element is not situated at the front of the vehicle makes it difficult to achieve a required amount of natural airflow through the radiator element. It is therefore advantageous to use a radiator fan to provide a desired airflow through the radiator element.

According to another preferred embodiment of the invention, the radiator element takes the form of an extra radiator which forms part of the cooling system and is adapted to being used when an ordinary radiator does not have sufficient capacity for cooling the coolant circulating in the cooling system. An air-cooled radiator in a cooling system is normally situated in a front portion of a vehicle. However, the need for cooling in heavy vehicles is constantly increasing. In particular, a heavy vehicle operating in a hot environment and/or subject to long periods of high engine load makes it difficult to meet the cooling requirement with a conventional cooling system which only comprises a radiator situated in the front portion of the vehicle. The extra radiator element may be used with existing cooling systems in cases where the vehicle's ordinary radiator does not have the capacity for cooling the circulating coolant down to a required temperature. To this end, the vehicle may comprise a control unit which detects when the extra radiator element needs to be connected. Alternatively, the radiator element according to the present invention may form part of a separate cooling system which is substantially continuously activated during operation of the vehicle in order to cool one or more components of the vehicle.

BRIEF DESCRIPTION OF THE INVENTION

Figure 2:
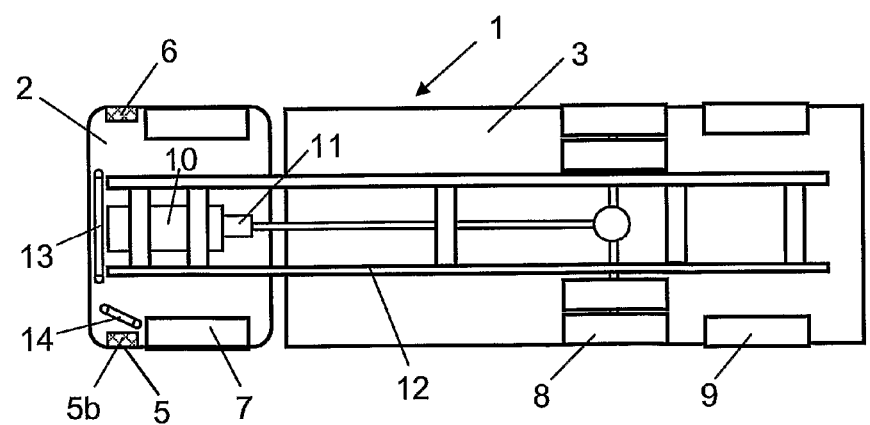
Figure 3:
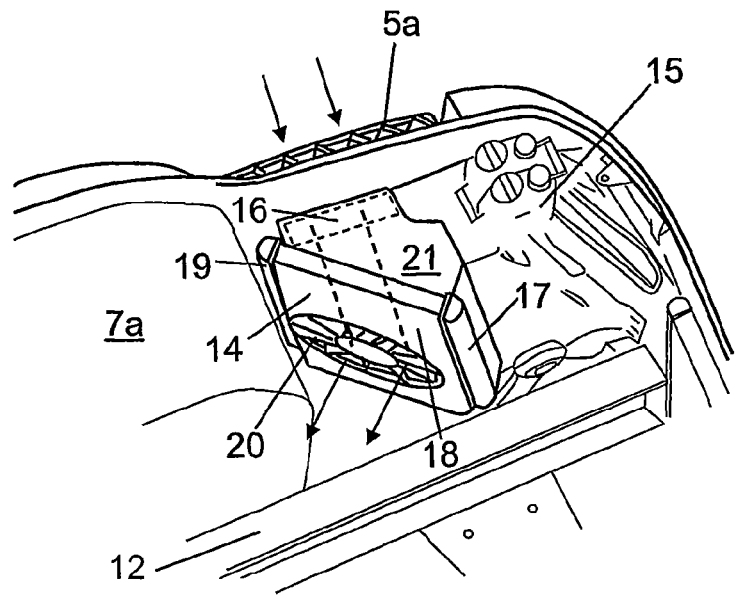
Figure 4:
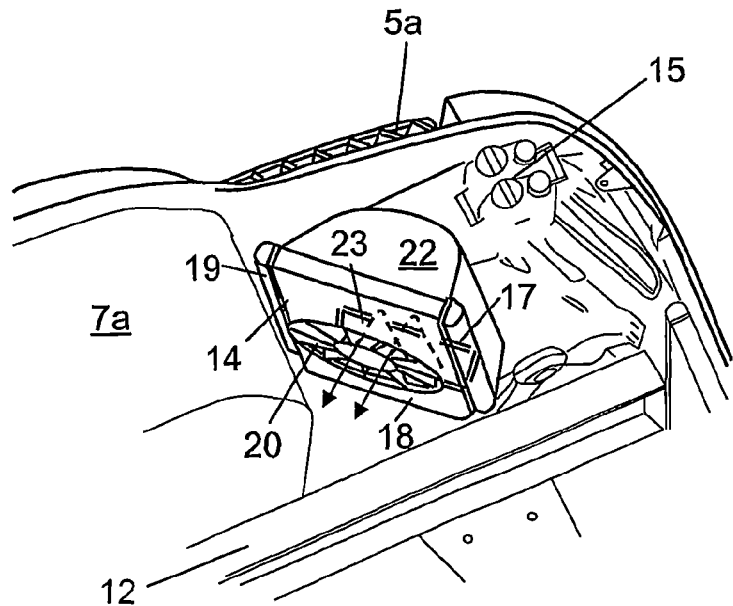

Preferred embodiments of the invention are described below by way of examples with reference to the attached drawings, in which:

FIG. 1 depicts a truck with a cooling system according to a first embodiment of the invention, FIG. 2 depicts the vehicle in FIG. 1 as seen from underneath, FIG. 3 depicts the extra radiator element of the cooling system in more detail and FIG. 4 depicts a cooling system with an extra radiator element according to a second embodiment.

DETAILED DESCRIPTION OF PREFERRED EMBODIMENTS OF THE INVENTION

FIGS. 1 and 2 depict schematically a truck 1 with a driver's space 2 and a cargo space 3. The truck 1 comprises a body with doors 4 which are arranged on opposite sides of the vehicle to afford access to the driver's space 2. On heavy trucks the driver's space 2 is usually situated at a relatively great height above ground level. To make it easier to climb up to and down from the driver's space 2, the vehicle is provided with step elements 5, 6 on the respective sides of the driver's space 2. The truck 1 comprises steerable front wheels 7, powered rear wheels 8 and unpowered rear wheels 9. The truck 1 is powered by a diesel engine 10 which transmits its driving torque via a driveline to the powered wheels 8. The driveline comprises inter alia a gearbox 11. The truck's body comprises loadbearing members 12 which inter alia support the diesel engine 10.

The truck 1 comprises a cooling system for cooling the diesel engine 10. The cooling system comprises a circulating coolant which circulates in an undepicted pipe system. The circulating coolant is adapted to cooling the diesel engine 10 and giving off its heat in a first radiator 13 situated in a front portion of the vehicle 1. The circulating coolant is cooled in the first radiator element 13 by ambient air flowing through passages in the radiator element 13. The first radiator element 13 thus has a conventional location in the vehicle 1. Such a location of the radiator element 13 is advantageous when a natural air flow occurs through the radiator element 13 during operation of the vehicle 1, but a radiator fan is commonly used to ensure that a desired air flow through the first radiator element 13 is provided in all operating conditions of the vehicle. However, the space in the front portion of the vehicle is limited. Like other spaces in a vehicle, this space is also subject to severe competition from other components of the vehicle. It is therefore not always possible for the radiator element 13 to be of a desired size such as to ensure that it can cope with cooling the circulating coolant down to a desired temperature level, e.g. when the truck 1 is operated in a hot environment and/or the diesel engine 10 is subject to long periods of high load.

For the cooling system to be able to provide necessary cooling of the circulating coolant even in such circumstances, the cooling system comprises an extra radiator 14. FIG. 3 depicts the extra radiator element 14 in more detail. The extra radiator element 14 is situated forward of the vehicle's front wheel 7, substantially immediately forward of its wheel housing 7a. Between the wheel housing 7a and forward components 15 of the vehicle which are schematically depicted in FIG. 3 there is usually an accessible space which it is very appropriate to use for fitting the extra radiator element 14. The extra radiator element 14 is thus situated substantially immediately inside the step element 5 on the driver's side of the vehicle. The step element 5 comprises here two steps 5a, b. The steps 5a, b are provided with a lattice structure which has holes running through it. Between steps 5a, b there is an inlet aperture 16 for ambient air, represented by broken lines in FIG. 3. The extra radiator element 14 is of conventional construction, with a tubular inlet portion 17 adapted to receiving the hot coolant from the engine 10. The extra radiator element 14 further comprises an intermediate radiator portion 18 in which the coolant is subjected to its main cooling. The pipes of the radiator portion 18 are provided in a conventional manner with flanges or the like to increase the heat transfer surface between the coolant and the air which flows through the radiator portion 18. The extra radiator element 14 also comprises a tubular outlet portion 19 adapted to receiving the coolant after it has been cooled in the radiator portion 18. A radiator fan 20 provides a forced airflow through the radiator portion 18 so that the coolant is subjected to effective cooling during its passage through the radiator portion 18.

The cooling system comprises a duct element 21 which has a passage with an extent from the inlet aperture 16 in the vehicle's body to the radiator portion 18. The duct element 21 may be made of a suitable plastic or sheetmetal material. The passage of the duct element 21 thus provides a controlled flow of ambient air from the inlet aperture 16 to the extra radiator element 14. The shape of the passage of the duct element 21 is such as to cause substantially uniform distribution of the airflow through the radiator portion 18. The location of the extra radiator element 14 is such as to provide a certain flow of air via the duct element 21 to the radiator portion 18 during operation of the vehicle, but activation of the radiator fan 20 is usually necessary in order to achieve a desired air flow to radiator portion 18. This airflow is represented by the arrows in FIG. 3. The radiator fan 20 is with advantage driven by an undepicted separate electric motor.

During normal operation of the vehicle 1, the cooling system uses only the first radiator element 13 to cool the circulating coolant. In situations where the first radiator element 13 does not have capacity for cooling the coolant to a sufficiently low temperature level, part of the coolant is distributed to the extra radiator element 14. To this end, the cooling system may comprise a temperature sensor which detects the temperature of the coolant at a suitable point in the cooling system. An electric control unit uses information from the temperature sensor to adjust a valve or the like in the cooling system so that coolant is also led to the extra radiator element 14 when the temperature of the coolant exceeds a reference value. When coolant is distributed to the extra radiator element 14, the radiator fan 20 is started to provide a desired amount of controlled airflow from the inlet aperture 16 to the extra radiator element 14. Such an extra radiator element 14 provides the cooling system with extra capacity which can be used when the ordinary radiator element 13 is not able to cool the coolant to a desired temperature level.

FIG. 4 depicts an alternative form of duct element 22. In this case, the duct element 22 has a passage extending from an inlet aperture 23 on the underside of the vehicle to the radiator portion 18 of the extra radiator element 14. The underside of the vehicle is not normally covered entirely by sheetmetal or the like. It is therefore possible to fit a duct element 22 with a portion protruding downwards which comprises an inlet aperture 23 on the underside of the vehicle whereby it is possible to lead ambient air in. The inlet aperture 23 is represented by broken lines in FIG. 4. The passage of the duct element 22 thus provides a controlled flow of ambient air from the underside of the vehicle to the extra radiator element 14. This case also requires activation of a radiator fan 20 to provide a desired amount of airflow from the inlet aperture 23 to the radiator portion 18. This airflow is represented by arrows in FIG. 4. Here again, the radiator fan 20 may be driven by a separate electric motor. The function of this embodiment corresponds to the embodiment in FIG. 3 except that in this case the air is drawn in via an inlet aperture 23 situated on the underside of the vehicle.

The invention is in no way limited to the embodiments described but may be varied freely within the scopes of the claims. The extra radiator element 14 may alternatively be situated forward of the front wheel 7 on the vehicle's passenger side. At this location there is usually likewise an accessible space inside the step element 6. The cooling system may be employed on substantially any desired vehicle which is provided with some form of step element.

The radiator element 14 need not be an extra radiator in a cooling system which comprises two or more radiator elements. The radiator element 14 may be used as the sole radiator element in a cooling system. The cooling system may be intended to cool substantially any desired components or media of a vehicle. The radiator element may for example take the form of an air-cooled charge air cooler which cools the compressed air which is led to a supercharged combustion engine. The radiator element may also be an air-cooled EGR cooler which cools exhaust gases which are recirculated to a combustion engine.

The invention claimed is:

1. A combination comprising a cooling system and a motor vehicle, the cooling system being positioned in the motor vehicle, the motor vehicle having a body, an engine which moves the motor vehicle, a driver's space, at least one door for access to the driver's space, and a step element with at least one step and positioned below the at least one door, the cooling system comprising:
   a radiator element positioned in the body and configured to cool a circulating coolant by an airflow flowing through the radiator element, the circulating coolant cooling the engine;
   a temperature sensor detecting the temperature of the circulating coolant;
   a valve which is controlled by a control device to allow the circulating coolant to flow through the radiator element when the temperature of the circulating coolant exceeds a predetermined value; and
   an inlet aperture positioned in the body below the at least one step, the inlet aperture being configured to pass therethrough at least part of the airflow to the radiator element,
   the radiator element being further configured such that the airflow exiting the radiator element is directed outside of the motor vehicle.

2. The combination according to claim 1, wherein the radiator element is positioned forward of a driver's side front wheel of the vehicle.

3. The combination according to claim 1, wherein the step element comprises at least two steps, and the inlet aperture is positioned in a space between the at least two steps.

4. The combination according to claim 1, wherein the cooling system comprises a duct element comprising a passage configured to conduct at least part of the airflow, the passage extending from the inlet aperture to the radiator element.

5. The combination according to claim 1, wherein the radiator element comprises a radiator fan configured to increase the airflow to the radiator element.

6. The combination of claim 1, wherein the radiator element is situated inside the step element.

7. A combination comprising a cooling system and a motor vehicle, the cooling system being positioned in the motor vehicle, the motor vehicle having a body, a driver's space, at least one door for access to the driver's space, and a step element with at least one step and positioned below the at least one door, the cooling system comprising:
   a radiator element positioned in the body to cool a circulating coolant by air from outside the body flowing through the radiator element;
   an inlet aperture positioned in the body below the at least one step, the inlet aperture being configured to pass therethrough at least part of the air from outside the body to the radiator element,
   wherein the motor vehicle has an ordinary radiator element configured to cool the circulating coolant, and the ordinary radiator element has a respective cooling capacity;
   a control device controlling the radiator element of the cooling system to cool the circulating coolant when the cooling capacity of the ordinary radiator element is insufficient to cool the circulating coolant.

8. A combination comprising a motor vehicle and a cooling system positioned in the motor vehicle, the motor vehicle having a body, an engine which moves the motor vehicle, a driver's space in the body, at least one door for access to the driver's space, a step element with at least one step and positioned below the at least one door, and at least a driver's side front wheel, the cooling system comprising:
   a radiator element positioned in the body forward of the driver's side front wheel and configured to cool a circulating coolant by an airflow flowing through the radiator element, the circulating coolant cooling the engine;
   a temperature sensor detecting the temperature of the circulating coolant;
   a valve which is controlled by a control device to allow the circulating coolant to flow through the radiator element when the temperature of the circulating coolant exceeds a predetermined value; and
   an inlet aperture positioned in the body below the at least one step, the inlet aperture being configured to pass therethrough at least part of the airflow to the radiator element,
   the radiator element being further configured such that the airflow exiting the radiator element is directed outside of the motor vehicle.

9. The combination according to claim 8, wherein the step element comprises at least two steps, and the inlet aperture is positioned in a space between the at least two steps.

10. The combination according to claim 9, wherein each of the at least two steps has a perforated structure for allowing the passing of the airflow.

11. The combination according to claim 8, wherein the cooling system comprises a duct element comprising a passage configured to conduct at least part of the airflow, the passage extending from the inlet aperture to the radiator element.

12. The combination according to claim 11, wherein the radiator element comprises a radiator fan configured to increase the airflow to the radiator element.

13. A combination comprising a motor vehicle and a cooling system positioned in the motor vehicle, the motor vehicle having a body, a driver's space in the body, at least one door for access to the driver's space, a step element with at least one step and positioned below the at least one door, and at least a driver's side front wheel, the cooling system comprising:
- a radiator element positioned in the body forward of the driver's side front wheel to cool a circulating coolant by air from outside the body flowing through the radiator element;
- an inlet aperture positioned in the body below the at least one step, the inlet aperture being configured to pass therethrough at least part of the air from outside the body to the radiator element,
- wherein the motor vehicle has an ordinary radiator element configured to cool the circulating coolant, and the ordinary radiator element has a respective cooling capacity;
- a control device controlling the radiator element to cool the circulating coolant when the cooling capacity of the ordinary radiator element is insufficient to cool the circulating coolant.

14. A combination comprising a cooling system and a motor vehicle, the cooling system being positioned in the motor vehicle, the motor vehicle having a body, an engine which moves the motor vehicle, a driver's space, at least one door for access to the driver's space, and a step element with at least one step and positioned below the at least one door, the cooling system comprising:
- a radiator element positioned in the body and configured to cool a circulating coolant by an airflow flowing through the radiator element, the circulating coolant cooling the engine;
- a temperature sensor detecting the temperature of the circulating coolant;
- a valve which is controlled by a control device to allow the circulating coolant to flow through the radiator element when the temperature of the circulating coolant exceeds a predetermined value; and
- an inlet aperture positioned in the body below the at least one step, the inlet aperture being configured to pass therethrough at least part of the airflow to the radiator element,
- the radiator element being further configured such that the airflow exiting the radiator element is directed outside of the motor vehicle,
- wherein the airflow exiting the radiator element is directed underneath the motor vehicle.

15. A combination comprising a motor vehicle and a cooling system positioned in the motor vehicle, the motor vehicle having a body, an engine which moves the motor vehicle, a driver's space in the body, at least one door for access to the driver's space, a step element with at least one step and positioned below the at least one door, and at least a driver's side front wheel, the cooling system comprising:
- a radiator element positioned in the body forward of the driver's side front wheel and configured to cool a circulating coolant by an airflow flowing through the radiator element, the circulating coolant cooling the engine;
- a temperature sensor detecting the temperature of the circulating coolant;
- a valve which is controlled by a control device to allow the circulating coolant to flow through the radiator element when the temperature of the circulating coolant exceeds a predetermined value; and
- an inlet aperture positioned in the body below the at least one step, the inlet aperture being configured to pass therethrough at least part of the airflow to the radiator element,
- the radiator element being further configured such that the airflow exiting the radiator element is directed outside of the motor vehicle,
- wherein the airflow exiting the radiator element is directed underneath the motor vehicle.

* * * * *